US010824804B2

(12) United States Patent
Jang

(10) Patent No.: US 10,824,804 B2
(45) Date of Patent: Nov. 3, 2020

(54) METHOD AND SYSTEM FOR EXPANSION TO EVERYDAY LANGUAGE BY USING WORD VECTORIZATION TECHNIQUE BASED ON SOCIAL NETWORK CONTENT

(71) Applicant: LINE Corporation, Shinjuku-Ku, Tokyo (JP)

(72) Inventor: Hyukjae Jang, Seongnam-si (KR)

(73) Assignee: LINE Corporation, Tokyo (JP)

( * ) Notice: Subject to any disclaimer, the term of this patent is extended or adjusted under 35 U.S.C. 154(b) by 207 days.

(21) Appl. No.: 16/008,198

(22) Filed: Jun. 14, 2018

(65) Prior Publication Data

US 2018/0365230 A1    Dec. 20, 2018

(30) Foreign Application Priority Data

Jun. 20, 2017  (KR) ........................ 10-2017-0077859

(51) Int. Cl.

| G06F 40/00 | (2020.01) |
|---|---|
| G06F 40/247 | (2020.01) |
| G06F 16/21 | (2019.01) |
| G06F 16/2455 | (2019.01) |
| G06F 16/36 | (2019.01) |
| G06Q 50/00 | (2012.01) |
| G06F 40/216 | (2020.01) |
| G06F 40/242 | (2020.01) |
| G06F 40/284 | (2020.01) |

(52) U.S. Cl.
CPC ............ G06F 40/247 (2020.01); G06F 16/21 (2019.01); G06F 16/2455 (2019.01); G06F 16/36 (2019.01); G06F 40/216 (2020.01); G06F 40/242 (2020.01); G06F 40/284 (2020.01); G06Q 50/01 (2013.01)

(58) Field of Classification Search
CPC ........ G06Q 30/02; G06Q 50/00; H04L 12/58; H04L 29/08
See application file for complete search history.

(56) References Cited

U.S. PATENT DOCUMENTS

| 5,754,939 A * | 5/1998 | Herz .................... G06Q 20/383 |
|---|---|---|
| | | 348/E7.056 |
| 7,065,550 B2 * | 6/2006 | Raghunandan ........ G06Q 30/02 |
| | | 709/203 |

(Continued)

FOREIGN PATENT DOCUMENTS

| JP | 2005310094 A | 11/2005 |
|---|---|---|
| KR | 2006-0134450 A | 12/2006 |

OTHER PUBLICATIONS

Office Action dated Jan. 29, 2019 in corresponding Korean Patent Application No. 10-2017-0077859.

*Primary Examiner* — Edgar X Guerra-Erazo
(74) *Attorney, Agent, or Firm* — Harness, Dickey & Pierce, P.L.C.

(57) ABSTRACT

Provided is a method and system for expanding to an everyday language using a word vectorization technique based on social network content. A content providing method includes collecting social network content on the Internet; expanding corresponding content information to a word set of words included in the social network content with respect to target content that is to be serviced to a client; and providing the target content to the client with respect to user information associated with the client using the word set.

15 Claims, 9 Drawing Sheets

(56) References Cited

U.S. PATENT DOCUMENTS

| | | | | |
|---|---|---|---|---|
| 8,166,032 B2* | 4/2012 | Sommer | ............... | G06F 16/355 |
| | | | | 707/736 |
| 10,073,830 B2* | 9/2018 | Walia | ................... | G06F 16/322 |
| 2006/0020593 A1* | 1/2006 | Ramsaier | ............ | G06F 16/9535 |
| 2008/0147482 A1* | 6/2008 | Messing | ................ | G06Q 50/01 |
| | | | | 705/14.53 |
| 2008/0147487 A1* | 6/2008 | Hirshberg | .............. | G06Q 30/02 |
| | | | | 705/14.53 |
| 2008/0294622 A1* | 11/2008 | Kanigsberg | ............ | G06Q 30/02 |
| 2010/0057577 A1* | 3/2010 | Stefik | ..................... | G06Q 30/02 |
| | | | | 705/14.73 |
| 2011/0288935 A1* | 11/2011 | Elvekrog | ................ | H04L 51/32 |
| | | | | 705/14.53 |
| 2011/0288937 A1* | 11/2011 | Manoogian, III | ..... | G06Q 50/01 |
| | | | | 705/14.66 |
| 2011/0288939 A1* | 11/2011 | Elvekrog | ........... | G06Q 30/0269 |
| | | | | 705/14.67 |
| 2016/0267536 A1* | 9/2016 | Elvekrog | ................ | H04L 51/32 |
| 2017/0302716 A1* | 10/2017 | Stiers | ................. | G06F 16/9535 |
| 2019/0362441 A1* | 11/2019 | Doyle | ................ | G06Q 30/0269 |

* cited by examiner

METHOD AND SYSTEM FOR EXPANSION TO EVERYDAY LANGUAGE BY USING WORD VECTORIZATION TECHNIQUE BASED ON SOCIAL NETWORK CONTENT

CROSS-REFERENCE TO RELATED APPLICATION(S)

This application claims priority under 35 U.S.C. § 119 to Korean Patent Application No. 10-2017-0077859 filed on Jun. 20, 2017, in the Korean Intellectual Property Office (KIPO, the entire contents of which are incorporated herein by reference.

BACKGROUND

Field

One or more example embodiments relate to a technique for collecting and using an everyday language included in social network content.

Description of Related Art

A sudden increase in a number of users of ultra high-speed communication networks enables the development of various services and diversification of service items.

For example, a technique for providing various content through a keyword matching service in a mobile communication environment is known.

In the meantime, in the case of words used by persons for their daily conversations or messengers, persons tend to use different words depending on their gender, age, etc., even though the words have the same meaning. Also, a lot of slang, expletives, colloquial words, and abbreviations are used, for example, <personal computer room, PC room, game room, gam-room, P-room>.

When executing advertising based on conversations made between persons in a messenger, a keyword matching is generally attempted based on a predesignated advertising category or a dictionary prepared by a person in advance. Here, due to the above reasons, it is often difficult to understand the context or meaning of conversation or to match keywords.

Languages (words) used by persons may vary over time, such as, for example, a fad word showing a change of <esta bon→cool→rock→swag!> in the meaning of 'good.' Even in this case, it is difficult to match keywords if a scheme using a predesignated word dictionary or the like is used.

Also, when trying to match keywords or to understand the context of conversation, the conversation may be made using only proper nouns (e.g., TV entertainment programs 'reckless challenge, 'war of words,' etc.) instead of using common nouns that refer to a specific field. To register such proper nouns to a dictionary one by one is difficult and has some constraints.

SUMMARY

One or more example embodiments provide a method and system that translates input keyword into everyday language using an everyday language based word set.

One or more example embodiments provide a method and system that may collect everyday language on a social network service (SNS), a messenger, etc., through which it is possible to recognize words actually used by persons for their daily lives and may use the collected everyday languages in a content providing field, such as advertising, search, and the like.

One or more example embodiments also provide a method and system that may convert and expand a keyword or a category input from a content provider or a word of a dictionary database to a language frequently used by persons for daily life and may use the converted and expanded word, instead of directly using the keyword, the category, or the word.

One or more example embodiments also provide a method and system that may automate a conversion and expansion process to an everyday language using a system, instead of manually performing the conversation and expansion process one by one.

According to an aspect of at least one example embodiment, there is provided a computer implemented content providing method, including collecting social network content on the Internet; expanding corresponding content information to a word set of words included in the social network content with respect to target content that is to be serviced to a client; and providing the target content to the client with respect to user information associated with the client using the word set.

The content providing method may further include constructing a keyword database for converting a word to a vector using the social network content. The expanding may include generating a synonym set for the content information by referring to the keyword database.

The constructing may include constructing a keyword database based on each classification criterion of the social network content, and the expanding may include generating the synonym set for the content information by referring to a keyword database of a classification criterion corresponding to a target of the target content.

The constructing may include constructing a keyword database for each language with respect to the social network content, and the expanding may include expanding the word set to at least one object language for the content information by referring to the keyword database for each language.

The constructing may include preprocessing the social network content using a natural language processing technique; and generating a keyword database including a vector table by vectorizing the preprocessed words.

The constructing may include updating the keyword database by periodically collecting the social network content.

The expanding may include converting a word corresponding to the content information to a vector form and extracting a synonym based on the converted vector by referring to the keyword database.

The expanding may include generating the synonym set for the content information by converting a word corresponding to the content information to a vector form and by extracting a word with a similarity in a vector space based on the converted vector by referring to the keyword database.

The providing may include providing the word set to the client and transferring the target content to the client in response to a content request from the client. The client may request the target content based on a result of comparing the user information to the word set.

The providing may include receiving the user information from the client and transferring the target content to the client based on a result of comparing the user information to the word set.

According to an aspect of at least one example embodiment, there is provided a non-transitory computer-readable recording medium storing instructions that, when executed by a processor, cause the processor to implement a content providing method in conjunction with a computer system, the method including collecting social network content on the Internet, and constructing a keyword database for converting a word to a vector using the social network content; expanding corresponding content information to a word set of words included in the social network content with respect to target content that is to be serviced to a client; and providing the target content to the client with respect to user information associated with the client using the word set.

According to an aspect of at least one example embodiment, there is provided a computer-implemented content providing system, including at least one processor configured to execute non-transitory computer-readable instructions. The at least one processor includes a constructor configured to collect social network content on the Internet, and to construct a keyword database for converting a word to a vector using the social network content; an expander configured to expand corresponding content information to a word set of words included in the social network content with respect to target content that is to be serviced to a client; and a provider configured to provide the target content to the client with respect to user information associated with the client using the word set.

According to some example embodiments, it is possible to collect everyday language on an SNS, a messenger, etc., through which it is possible to recognize words actually used by persons for their daily lives and to use the collected everyday languages in a content providing field, such as advertising, search, and the like.

Also, according to some example embodiments, it is possible to convert and expand a keyword or a category input from a content provider or a word of a dictionary database to a language frequently used by persons for daily life and to use the converted and expanded word, instead of directly using the keyword, the category, or the word.

Also, according to some example embodiments, it is possible to automate a conversion and expansion process to an everyday language using a system, instead of manually performing the conversation and expansion process one by one.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
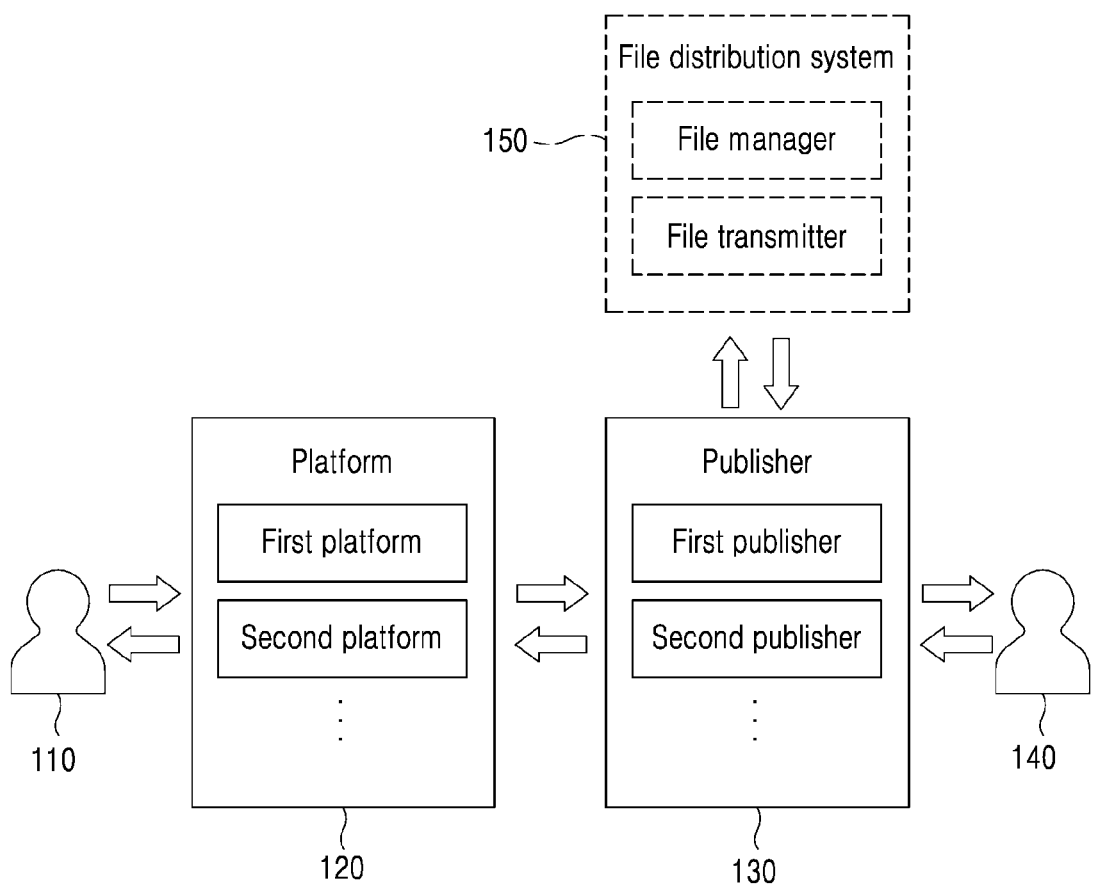
FIG. 1 is a diagram illustrating an example of a configuration of a content providing environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to a technique for constructing an everyday language-based word set and using the word set for a content providing service.

The example embodiments disclosed herein may construct an everyday language-based word set based on social network content and may provide content using the everyday language-based word set, thereby achieving many advantages in terms of accuracy, efficiency, convenience, cost saving, and the like.

The term "content" used herein may indicate information data, for example, advertising content, and any type of information data providable through the Internet, computer communication, and the like, such as movie information, news, moving pictures, images, community posts, and the like. That is, the content may include any type of targets providable to a user through an advertising model, a search engine, etc.

Hereinafter, the example embodiments are described based on advertising content. However, it is provided as an example only. As described above, any type of contents that may be provided to the user through the Internet, computer communication, and the like as well as contents provided as search results may be applied.

FIG. 1 illustrates an example of a content providing environment according to at least one example embodiment. Here, FIG. 1 illustrates a content provider 110, a platform 120, a publisher 130, and/or a user 140. Here, each of the content provider 110 and the user 140 may refer to a terminal, such as a personal computer (PC), a smartphone, etc., actually used by the content provider 110 or the user 140. That is, in FIG. 1, indicators with arrowheads among the content provider 110, the platform 120, the publisher 130, and the user 140 may indicate that data may be transmitted and received over a wired/wireless network among the terminal used by the content provider 110, the platform 120, the publisher 130, and/or the terminal used by the user 140.

The platform 120 may refer to a system that may perform bidding for content provided as information data of the content provider 110, matching between targeting elements for a user to which content is to be provided, sorting of contents, providing content to the publisher 130, charging the content provider 110 according to a display of content, and the like.

The term "publisher" used herein may be interchangeably used with the term "site." Here, a description using the term "site" also includes a probability that an example embodiment is applicable in an environment, such as an application screen executed on a mobile terminal, although it is not a general website access through a PC. Inversely, the term "site" may be interchangeably used with the term "publishing site" or "publisher." That is, each site may correspond to each individual publisher (e.g., a first publisher, a second publisher, . . . ) included in the publisher 130. Here, each of the individual publishers may be configured as one or more publisher servers. Here, the term "site" may include any type of websites that may display content and may provide the content to the user 140 through a wired network or a wireless network. Also, the site may indicate a single webpage that constitutes a website.

Also, the term "display" of content used herein may be translated to include providing promotion content, that is, information data associated with the content provider 110 to a visitor of a corresponding site through the publisher 130.

The publisher 130 may receive content to be provided through a site of the publisher 130 from the platform 120 and may provide the content to the user 140. For example, the publisher 130 may receive information data from the platform 120 as additional content corresponding to a search query input from the user 140 or a keyword included in conversation data in a messenger or other action analytic results and may provide the information data to the user 140.

As described above, the publisher 130 may provide a path through which the user 140 may directly receive content. In a general online environment, contents may be provided through a website/mobile site. Here, each of the individual platforms (e.g., a first platform, a second platform, . . . ) included in the platform 120 may display content through at least one of a plurality of individual publishers (e.g., the first publisher, the second publisher, . . . ) included in the publisher 130. Here, each of the individual platforms may be configured as one or more platform servers.

A file distribution system 150 may be selectively used depending on necessity. For example, if the user 140 uses a mobile terminal, the file distribution system 150 may provide the user 140 with a file for installing an application associated with the publisher 130 on the mobile terminal. To this end, the file distribution system 150 may include a file manager configured to store and manage the file and a file transmitter configured to transmit the file to the mobile terminal in response to a request from the mobile terminal of the user 140. The application may be installed on the mobile terminal using the transmitted file. The application may control the mobile terminal to perform operations of providing content according to at least one example embodiment.

The content providing environment of FIG. 1 may be applicable to the example embodiments. Here, a provider of the platform 120 may design the platform 120 so that the content provider 110 may select or input information data, that is, content of the content provider 110, keywords or categories by contents, and a targeting target (e.g., an age, a gender, a field of interest, etc.) to which content is to be provided. Accordingly, the content provider 110 may register the content to the platform 120 by uploading the content to the platform 120 and bidding.

A program associated with the publisher 130 may be installed on the terminal used by the user 140. For example, the program may be installed on the terminal of the user 140 in an application form or a plug-in form and may control the terminal of the user 140 or a web browser installed on the terminal of the user 140 to output information provided from the publisher 130.

Hereinafter, a content providing system and a content providing method according to at least one example embodiment will be described.

Figure 2:
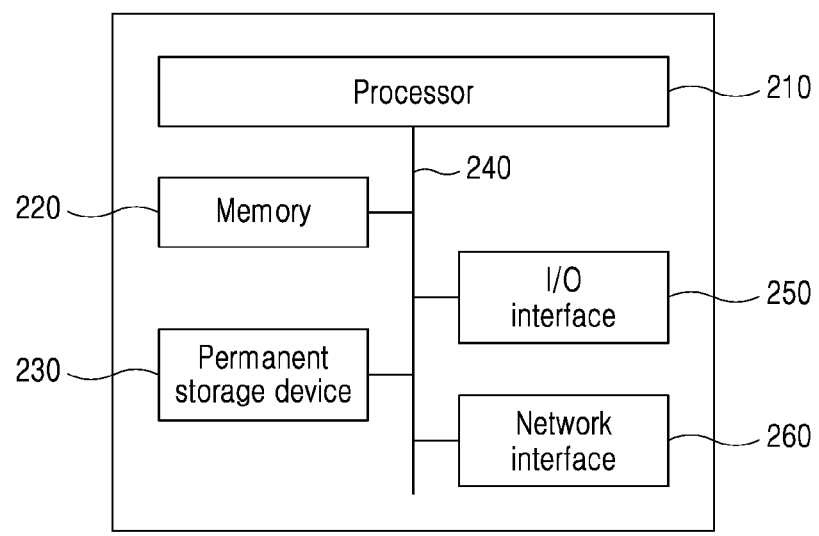
FIG. 2 is a block diagram illustrating an example of a computer system according to a least one example embodiment.

FIG. 2 is a block diagram illustrating an example of a computer system 200 according to at least one example embodiment. For example, a content providing system according to the example embodiments may be configured through a computer system 200 of FIG. 2. The content providing system may be a computer system that constitutes one of the plurality of individual platforms 120 described above with reference to FIG. 1.

Referring to FIG. 2, the computer system 200 may include a processor 210, a memory 220, a permanent storage device 230, a bus 240, an input/output (I/O) interface 250, and/or a network interface 260 as components to perform a content providing method.

The processor 210 may include a device capable of processing a sequence of instructions or may be a part thereof. The processor 210 may include, for example, a computer processor, a processor within a mobile device or another electronic device, and/or a digital processor. The processor 210 may be included in, for example, a server computing device, a server computer, a series of server computers, server farm, a cloud computer, a content platform, a mobile computing device, a smartphone, a tablet, a set-top box, and the like. The processor 210 may connect to the memory 220 through the bus 240.

The memory 220 may include a volatile memory, a permanent memory, a virtual memory, and/or other types of memories that may store information used by the computer system 200 or output from the computer system 200. The memory 220 may include, for example, random access memory (RAM) and/or dynamic RAM (DRAM). The memory 220 may be used to store information such as state information of the computer system 200. The memory 220 may be used to store instructions of the computer system 200 that includes instructions for controlling a face recognition camera. The computer system 200 may include one or more processors 210 if necessary or appropriate.

The bus 240 may include a communication-based structure that enables interaction between various components of the computer system 200. The bus 240 may convey data between the components of the computer system 200, for example, between the processor 210 and the memory 220. The bus 240 may include wireless and/or wired communication media between the components of the computer system 200 and may include parallel, serial, or other topology arrangements.

The permanent storage device 230 may include components, such as a memory or another permanent storage device, used by the computer system 200 to store data during an extended period (e.g., compared to that of the memory 220). The permanent storage device 230 may include a non-volatile main memory such as used by the processor 210 included in the computer system 200. The permanent storage device 230 may include, for example, flash memory, hard disk, optical disk, or other computer-readable media.

The I/O interface 250 may include a keyboard, a mouse, a voice command input, a display, or interfaces associated with other input or output devices. Configuration instructions and/or input associated with a face recognition camera may be received through the I/O interface 250.

The network interface 260 may include one or more interfaces associated with networks, such as the Internet or near field networks. The network interface 260 may include interfaces associated with wired or wireless connections. The configuration instructions may be received through the network interface 260. Information associated with the face recognition camera may be received or transmitted through the network interface 260.

According to other example embodiments, the computer system 200 may include components greater than the number of components shown in FIG. 2. However, there is no need to clearly illustrate many components according to the related art. For example, the computer system 200 may be configured to include at least a portion of I/O devices connected to the I/O interface 250 or to further include other components, such as a transceiver, a global positioning system (GPS) module, a camera, various sensors, a database, etc. In detail, if the computer system 200 is configured in a form of a mobile device such as a smartphone, the computer system 200 may be configured to further include various components, for example, a camera, an acceleration sensor or a gyro sensor, various types of physical buttons, a button using a touch panel, an I/O port, a vibrator for vibration, etc., which are generally included in the mobile device.

Figure 3:
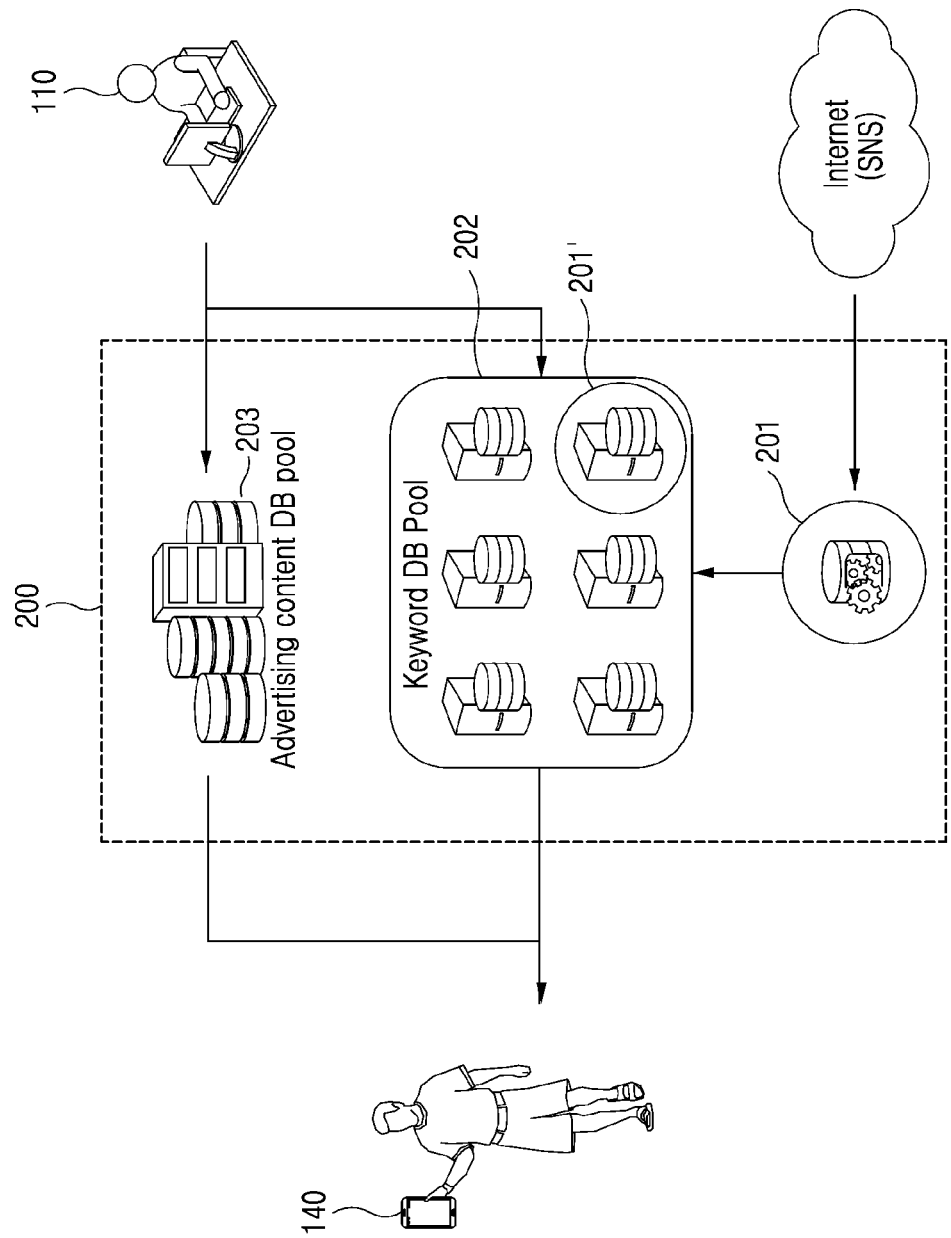
FIG. 3 illustrates an example of a technical scenario of constructing an everyday language-based word set and using the word set for providing advertising according to at least one example embodiment.

FIG. 3 illustrates an example of a technical scenario of constructing an everyday language-based word set and using the word set for providing advertising according to at least one example embodiment.

The computer system 200 may collect conversation data through a social network service (SNS), a messenger, etc., on the Internet, as social network content. The computer system 200 may collect the conversation data by classifying the conversation data based on an age, a gender, a field of interest, a language, etc., of a speaker. Information, for example, an age, a gender, a field of interest, a language, etc., used as a classification criterion of conversation data may be information that is preset through an advance registration or setting, or information that is derived from accumulated conversation data.

The computer system 200 may generate a keyword database (DB) 201 by performing natural language processing on the collected conversation data, and by converting a natural language processed word to a vector through word embedding. Here, the computer system 200 may generate the collected conversation data into the individual keyword database 201 based on the classification criterion, for example, an age, a gender, a field of interest, a language, and the like, and may update the generated keyword database 201 to a keyword database (DB) pool 202. The computer system 200 may generate and manage each keyword database 201 as a separate database, for example, a keyword database associated with men in their 20s, a keyword database associated with women in their 30s, and a keyword database associated with men in their 40s, based on the classification criterion of the conversation data.

The computer system 200 may store, in an advertising content database (DB) pool 203, advertising content that is registered by the content provider 110, such as an advertiser, through a procedure such as bidding. Here, the content provider 110 may input content information during a process of registering the advertising content. For example, the content information may be set as a target keyword, a category name, etc., through which advertising is to be provided. The content provider 110 may set information associated with a target desired to be advertised during a process of registering the advertising content. For example, the information may be an external condition, such as an age, a gender, a field of interest, and a language.

The computer system 200 may select a keyword database (DB) 201' based on information associated with the target input from the content provider 110 from the keyword database pool 202, may expand corresponding content information to an everyday language set by referring to the selected keyword database 201', and may transmit the corresponding language set to a client corresponding to the target in a desired dictionary form. Accordingly, the computer system 200 may construct a set of words expanded to an everyday language with respect to content information of the content provider 110 by referring to the keyword database 201' that is selected based on information associated with the target input from the content provider 110.

The computer system 200 may provide the advertising content registered by the content provider 110 to the user 140, for example, a mobile or PC client through the publisher 130, using a corresponding everyday language or exhibiting a related action based on the everyday language-based word set.

Accordingly, the computer system 200 may construct a word set in which context information, for example, a target keyword, a category, etc., is expanded to a language generally used during daily life, using a word vectorization scheme based on social network content, may analyze a conversation or an action of a user based on the word set, and may provide related advertising content.

Further, the computer system 200 may provide a function that enables the corresponding content provider 110 to perform monitoring and editing prior to providing the word set that is expanded to everyday language to the client with respect to content information of the content provider 110. Accordingly, the content provider 110 may perform monitoring of content information expanded to an everyday language set in advance, and may filter out some words, such as an inappropriate or undesired word, through edition, such as correct, delete, etc.

Figure 4:
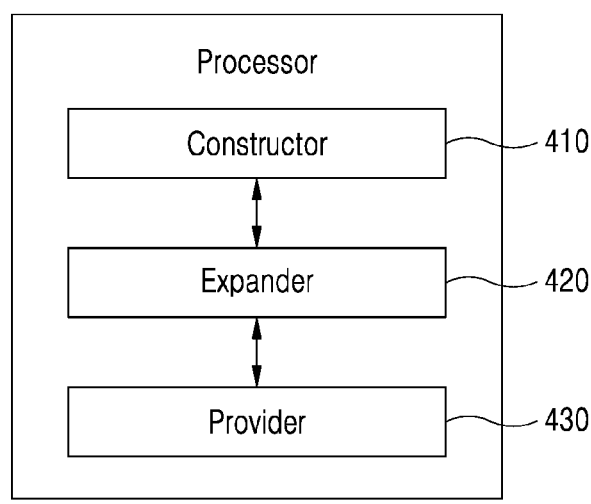
FIG. 4 is a block diagram illustrating an example of components in a processor of a computer system according to at least one example embodiment.
Figure 5:
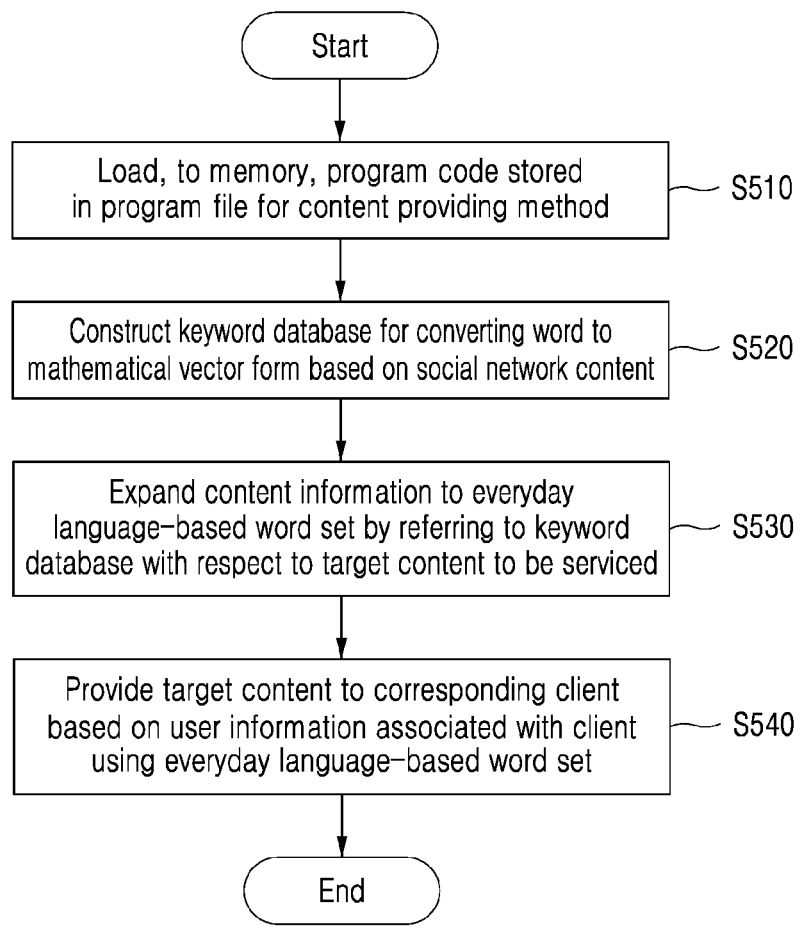
FIG. 5 is a flowchart illustrating an example of a content providing method performed by a computer system according to at least one example embodiment.

FIG. 4 is a block diagram illustrating an example of functional components in a processor of a computer system according to at least one example embodiment, and FIG. 5 is a flowchart illustrating an example of a content providing method performed by a computer system according to at least one example embodiment.

Referring to FIG. 4, the processor 210 may include a constructor 410, an expander 420, and/or a provider 430. The components of the processor 210 may be representations of different functions that are performed by the processor 210 in response to a control instruction provided according to at least one program code. For example, the constructor 410 may be used as a functional representation so that the processor 210 may control the computer system 210 to construct a keyword database using social network content. The processor 210 and the components of the processor 210 may be configured to perform operations 5510 through 5540 included in the content providing method of FIG. 5. For example, the processor 210 and the components of the processor 210 may be configured to execute instructions according to at least one program code and a code of an OS included in the memory 220. Here, the at least one program code may correspond to a code of a program configured to process the content providing method.

The content providing method may not be implemented in illustrated order. A portion of operations included in the content providing method may be omitted. Alternatively, an additional process may be further included in the content providing method.

Referring to FIG. 5, in operation 5510, the processor 210 may load, to the memory 220, a program code stored in a program file for the content providing method. For example, the program file for the content providing method may be stored in the permanent storage device 230 of FIG. 2. The processor 210 may control the computer system 200 so that the program code stored in the permanent storage device 230 may be loaded to the memory 220 through the bus 240. Here, the processor 210 and the constructor 410, the expander 420, and the provider 430 included in the processor 210 may be different functional representations of the processor 210 to implement operations 5520 through 5540 by executing an instruction of a corresponding portion in the program code loaded to the memory 220. The processor 210 and the components of the processor 210 may directly process an operation or may control the computer system 200 in response to a control instruction to implement operations 5520 through 5540.

In operation 5520, the constructor 410 may construct a keyword database for converting a word to a mathematical vector form based on social network content. The constructor 410 may collect conversation data through an SNS or a messenger on the Internet and may construct the keyword database using the collected conversation data. Here, the constructor 410 may collect the conversation data by classifying the conversation data based on an age, a gender, a field of interest, and a language of a speaker during a process of collecting the conversation data, and may construct a separate database based on each classification criterion, for example, an age, a gender, a field of interest, and a language, with respect to the collected conversation data. That is, the keyword database may include a plurality of databases. Here, each database may represent a corresponding characteristic (e.g., a keyword database associated with teenaged males, a keyword database associated with women in their 40s) based on each classification criterion (e.g., an age, a gender, a field of interest, and a language) of the conversation data. A method of constructing the keyword database is further described below.

In operation 5530, the expander 420 may expand corresponding content information to an everyday language-based word set by referring to the keyword database with respect to target content, for example, advertising content, to be serviced to a client. Here, the content information may include a target keyword and a category name associated with the target content. The expander 420 may select a keyword database corresponding to a target of corresponding content from among the plurality of keyword databases with respect to the target content. The expander 420 may convert the content information to a mathematical vector form by referring to the selected keyword database and may construct a semantically similar word set based on a converted vector. Accordingly, the expander 420 may expand a word corresponding to content information associated with the target content to a synonym set including semantically similar words in a vector space through a word vectorization scheme.

In operation 5540, the provider 430 may provide the target content to the corresponding client based on user information associated with the client using the everyday language-based word set. For example, the provider 430 may transfer the expanded word set for the target content to the client and may transfer the target content to the client in response to a content request based on the word set. Here, a client side may compare the corresponding word set to user information including an analysis result according to a conversation or an action (for example, search) of the user, and may request the target content based on a comparison result. As another example, the client side may transmit, to the content providing system 200, user information including the analysis result according to the conversation or other actions of the user. The provider 430 may compare the user information transmitted from the client side to the everyday language-based word set and may transfer the target content to the client based on a comparison result. For example, the provider 430 may provide the target content to a terminal of a user making a conversation or conducting a search using a word that matches or is semantically similar to a target keyword input from a content provider.

According to example embodiments, it is possible to expand corresponding content information to languages frequently used by persons during their daily lives with respect to target content desired to be serviced, and to provide the corresponding content to persons making a conversation or conducting a search using the expanded languages.

Figure 6:
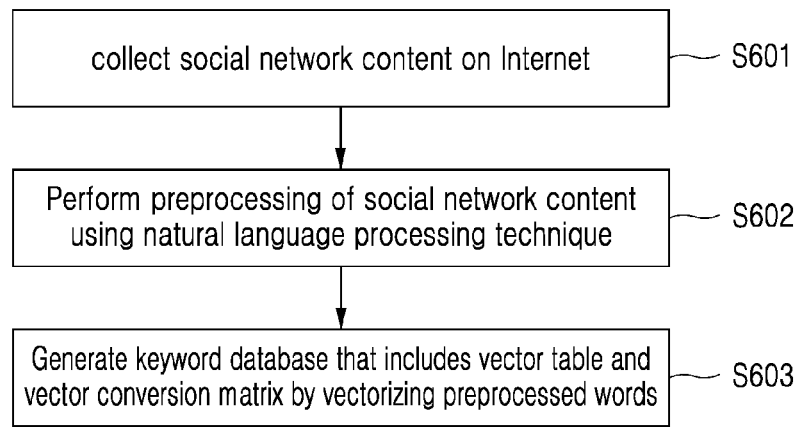
FIG. 6 is a flowchart illustrating an example of a process of constructing a keyword database according to at least one example embodiment.

FIG. 6 is a flowchart illustrating an example of a process of constructing a keyword database using several techniques in the field of language processing according to at least one example embodiment.

Referring to FIG. 6, in operation 5601, the constructor 410 may collect social network content on the Internet. The social network content may include conversation data, for example, conversations and posts through an SNS such as Facebook and Twitter, a messenger, blog, etc. The constructor 410 may collect the conversation data and may primarily generate a database. Here, the constructor 410 may collect the conversation data by separately classifying the conversation data based on an age, a gender, a field of interest, and a language of a speaker during a process of collecting the conversation data.

In operation 5602, the constructor 410 may perform preprocessing of the collected social network contents through a natural language processing technique. Here, the constructor 410 may convert, to a corpus form, conversation data that is preprocessed using a natural language processing technique. The constructor 410 may remove, from the conversation data, an unnecessary part of speech, such as a postposition, etc., or a special symbol (e.g., !, ?, /, etc.) and may extract a word (e.g., an infinitive verb, etc.) corresponding to a substantive or a root. For example, initial conversation data <speaker A: I ate black-bean-sauce noodles for lunch today. speaker B: Then, let's eat instant noodles tomorrow.> may be converted to <speaker A: I eat black-bean-sauce noodles lunch today. speaker B: tomorrow eat instant noodles.>

In operation 5603, the constructor 410 may generate a keyword database that includes a vector table and a matrix for vector conversion by vectorizing preprocessed words. The constructor 410 may vectorize all of the collected words through one-hot coding (applying one-hot orthography in a vectorization process for a collected word, the one-hot orthography being a method for indicating data as an arrangement of 0 and 1) may construct a neural network configured to calculate appearance probabilities of all words based on a locational correlation between the respective words based on order of preceding and succeeding words in the collected conversations using generated vectors, and may apply a maximum likelihood.

For example, the constructor 410 may calculate a probability of a word to be used for ( ) in "went to the supermarket and bought ice cream, and it made ( ) ache." The constructor 410 may maximize the neural network through an optimization scheme, for example, a gradient decent optimization. The constructor 410 may acquire a matrix that constitutes a hidden layer of the neural network as a result value through an optimization process and may convert a specific word to a vector through the matrix. Here, once a vector of a word to be converted is selected from among one-hot vectors of all words, a vector that is acquired as a result value of a multiplication operation through a result matrix becomes a result value. That is, each database includes a one-hot vector table of all words and a matrix for vector conversion. Words converted to vectors have a semantic relationship between vectors in a vector space. That is, semantically similar words may be clustered and a vector calculation (e.g., king-man+woman=queen) between the words is enabled. The constructor 410 may generate the collected conversation data as each individual keyword database based on a classification criterion (e.g., an age, a gender, a field of interest, a language, etc.). That is, the keyword database may include a plurality of databases configured to convert a specific input word to a specific mathematical vector. Here, each database may represent a corresponding characteristic based on a classification criterion (e.g., an age, a gender, a field of interest, a language, etc.) of the conversation data.

Accordingly, the constructor 410 may generate a database configured to collect language exchanged among persons during their daily lives and to convert each of the words to a vector. In particular, the constructor 410 may generate each individual keyword database for each language with respect to multiple languages when collecting daily conversations on the Internet. Here, the constructor 410 may generate a keyword database by translating content information (e.g., a target keyword and a category) received from a content provider for each object language or by replacing the content information with a corresponding word based on an International criterion. For example, the word "game" (English) may be replaced with "게임" (Korean), "ゲーム" (Japanese), "游戏" (Chinese), and the like, for the respective languages.

The aforementioned database (DB) generation process is provided as an example only. Known various arts, for example, word2vec, may be used.

Figure 7:
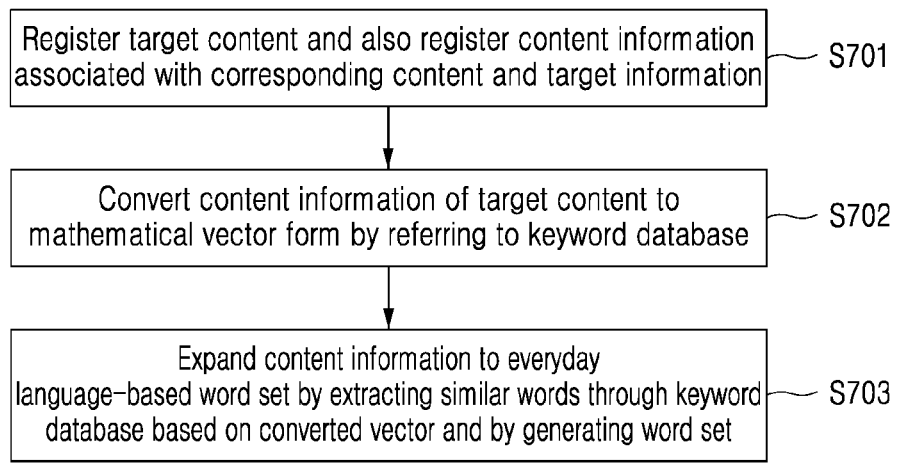
FIG. 7 is a flowchart illustrating an example of a process of expanding content information to an everyday language according to at least one example embodiment.

FIG. 7 is a flowchart illustrating an example of a process of expanding content information to an everyday language using several techniques in the field of language processing according to at least one example embodiment.

In operation 5701, the expander 420 may register content received from a content provider as target content to be serviced. Here, the expander 420 may also register content information including a target keyword and a category name associated with the corresponding content and information (e.g., an age, a gender, a field of interest, a language, etc.) associated with a target to which the corresponding content is to be provided.

In operation 5702, the expander 420 may convert the content information (e.g., a target keyword and a category) of the target content to a mathematical vector form by referring to a keyword database that is constructed in advance. Here, the expander 420 may select at least one keyword database corresponding to a target of the target content from among a plurality of keyword databases. The keyword database may be constructed as a plurality of databases based on a characteristic of conversation data, for example, an age, a gender, a field of interest, a language, etc., of a speaker. The expander 420 may select a database (e.g., a keyword database associated with teenaged males) that meets a condition about the target set by the content provider from among a plurality of keyword databases. Accordingly, the expander 420 may convert the content information of the target content to a vector value by referring to the keyword database selected from among the plurality of keyword databases.

Figure 8:
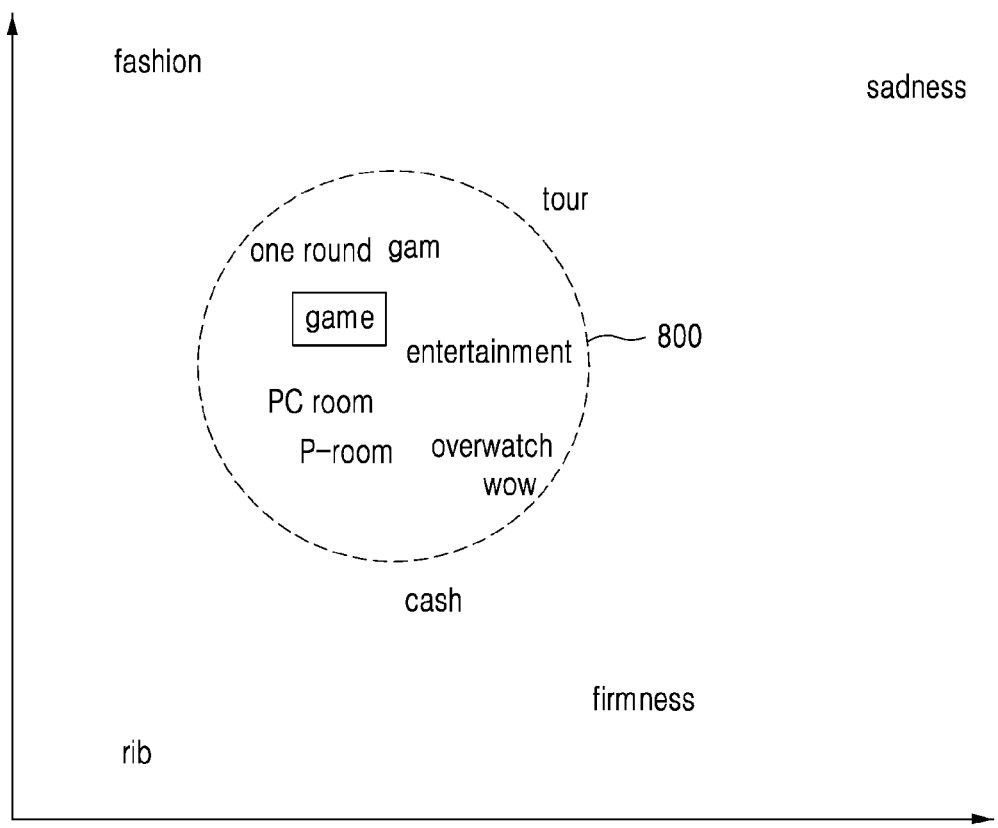
FIG. 8 illustrates an example in which words included in a keyword database appears on a vector space according to at least one example embodiment.

In operation 5703, the expander 420 may expand the content information to an everyday language-based word set by extracting similar words having a semantic similarity in a vector space through the keyword database based on the vector converted in operation 5702 and by generating a word set. Here, the similar words may be extracted using a method of calculating a distance between vectors and extracting words present within an Euclidean distance, a method of measuring a similarity between words using a cosine similarity, and the like. However, they are provided as examples only. Any method of extracting words having a similarity, that is, a semantic similarity in a vector space may be applicable. Among words converted to vectors through the keyword database, semantically similar words in the vector space are clustered. The keyword database may be constructed by collecting everyday conversations exchanged between persons through an SNS, a messenger, etc. Accordingly, once a word for targeting content is expanded by referring to the keyword database, a synonym set may be generated based on everyday languages actually used among persons or a set of proper nouns. For example, referring to FIG. 8, words included in a keyword database 801 associated with teenaged males are represented on a two-dimensional (2D) vector space. That is, the keyword database 801 may indicate a word set of words that are generally used by teenaged males on an SNS, a messenger, and the like. Words converted to vectors have a semantic relationship between vectors in the vector space. Here, semantically similar words, that is, words having similar meanings constitute a cluster 800. If 'game' is set as a target keyword by a content provider, 'game' may be expanded to <game, gam, entertainment, one round, PC room, P-room, overwatch, wow> that belong to the corresponding cluster 800. Here, a recent change in everyday languages of persons may be applied by periodically collecting usual conversations on the internet and by updating the keyword database at all times through an automation process by way of an internal system. The keyword database may include a plurality of databases based on a variety of criteria instead of being present as a single database. Accordingly, the keyword database may be selectively used for a target based on a condition (e.g., an age, a gender, a field of interest, a language, etc.) input from the content provider during a content registration process. In particular, if a keyword database is constructed for each language, a given keyword may be expanded to at least one object language at the same time. That is, expansion may be performed by translating the given keyword to an object language and by inputting the translated keyword to the keyword database for each language.

Figure 9:
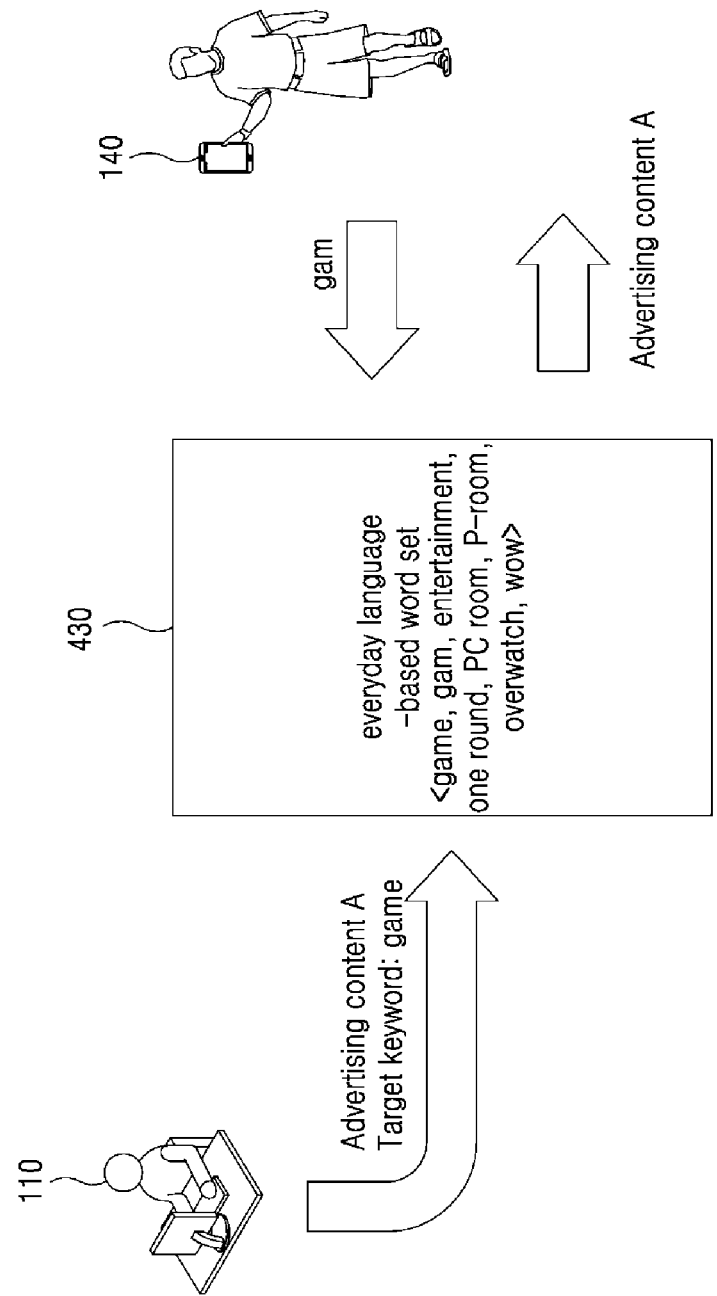
FIG. 9 illustrates an example of a process of providing target content using an everyday language-based word set according to at least one example embodiment.

The provider 430 may use an everyday language-based word set that is expanded from the corresponding content information when providing the target content to the user. For example, referring to FIG. 9, if the content provider 110 registers advertising content A and sets a target keyword for providing the advertising content A as "game," the target keyword "game" may be expanded to <game, gam, entertainment, one round, PC room, P-room, overwatch, wow> that is a set of words including semantically similar usual languages through the keyword database. In response to a keyword "gam" being input from the user 140 corresponding to the client for a conversation or search, the provider 430 may determine that the input keyword 'gam' belongs to the everyday language scope with the target keyword "game" since the input keyword is included in the everyday language-based word set, and accordingly may provide the advertising content A to the user 140.

According to some example embodiments, it is possible collect an everyday language on an SNS, a messenger, etc., through which it is possible to recognize words actually used by persons for their daily lives and to use the collected everyday languages in a content providing field, such as an advertising, search, and the like. Also, according to some example embodiments, it is possible to convert and expand a keyword or a category input from a content provider or a word of a dictionary database to a language frequently used by persons for daily life and to use the converted and expanded word, instead of directly using the keyword, the category, or the word. Also, according to some example embodiments, it is possible to automate a conversion and expansion process to an everyday language using a system, instead of manually performing the conversation and expansion process one by one.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer implemented content providing method, comprising:
    collecting social network content on Internet;
    vectorizing content words included in the social network content;
    constructing a plurality of keyword databases by classifying the vectorized content words such that each of the keyword databases includes a vector table and a vector conversion matrix;
    selecting one or more of the keyword databases corresponding to target content that is to be serviced to a client;
    converting one or more words corresponding to corresponding content information associated with the target content to a vector form, the corresponding content information including a corresponding target keyword and a corresponding category name associated with the target content;
    expanding the corresponding content information to a word set of synonym words by referring to the selected one or more of the keyword databases in a vector space; and
    providing the target content to the client with respect to user information associated with the client using the word set.

2. The method of claim 1, wherein
    the constructing comprises constructing the plurality of keyword databases each based on a corresponding classification criterion of the social network content, and
    the expanding comprises generating a synonym set for the corresponding content information by referring to one of the keyword databases of the corresponding classification criterion.

3. The method of claim 1, wherein
    the constructing comprises constructing each of the plurality of keyword databases for a corresponding language with respect to the social network content, and
    the expanding comprises expanding the word set to at least one object language for the corresponding content information by referring to a corresponding one of the keyword databases for the corresponding language.

4. The method of claim 1, wherein the constructing comprises:
    preprocessing the content words included in the social network content using a natural language processing technique; and
    generating the keyword databases each including the vector table by vectorizing the preprocessed content words.

5. The method of claim 1, wherein the constructing comprises updating the keyword databases by periodically collecting the social network content.

6. The method of claim 1, wherein
    the providing comprises providing the word set to the client and transferring the target content to the client in response to a content request from the client, and
    the client requests the target content based on a result of comparing the user information to the word set.

7. The method of claim 1, wherein the providing comprises receiving the user information from the client and transferring the target content to the client based on a result of comparing the user information to the word set.

8. A non-transitory computer-readable recording medium storing instructions that, when executed by a processor, cause the processor to implement a content providing method in conjunction with a computer system, the method comprising:
    collecting social network content on Internet;
    vectorizing content words included in the social network content;
    constructing a plurality of keyword databases by classifying the vectorized content words such that each of the keyword databases includes a vector table and a vector conversion matrix;
    selecting one or more of the keyword databases corresponding to target content that is to be serviced to a client;
    converting one or more words corresponding to corresponding content information associated with the target content to a vector form, the corresponding content information including a corresponding target keyword and a corresponding category name associated with the target content;
    expanding the corresponding content information to a word set of synonym words by referring to the selected one or more of the keyword databases in a vector space; and providing the target content to the client with respect to user information associated with the client using the word set.

9. A computer-implemented content providing system, comprising:
- at least one processor configured to execute non-transitory computer-readable instructions,
- wherein the at least one processor is configured to,
- collect social network content on Internet,
- vectorize content words included in the social network content,
- construct a plurality of keyword databases by classifying the vectorized content words such that each of the keyword databases includes a vector table and a vector conversion matrix,
- select one or more of the keyword databases corresponding to target content that is to be serviced to a client,
- convert one or more words corresponding to corresponding content information associated with the target content to a vector form, the corresponding content information including a corresponding target keyword and a corresponding category name associated with the target content,
- expand the corresponding content information to a word set of synonym words by referring to the selected one or more of the keyword databases in a vector space and
- provide the target content to the client with respect to user information associated with the client using the word set.

10. The content providing system of claim 9, wherein
the at least one processor is configured to construct the plurality of keyword databases each based on a corresponding classification criterion of the social network content, and
generate a synonym set for the content information by referring to one of keyword databases of the corresponding classification criterion.

11. The content providing system of claim 9, wherein
the at least one processor is configured to construct each of the plurality of keyword databases for a corresponding language with respect to the social network content, and
expand the word set to at least one object language for the corresponding content information by referring to a corresponding one of the keyword databases for the corresponding language.

12. The content providing system of claim 9, wherein the at least one processor is configured to,
preprocess the content words included in the social network content using a natural language processing technique, and
generate the keyword databases each including the vector table by vectorizing the preprocessed content words.

13. The content providing system of claim 9, wherein the at least one processor is configured to update the keyword databases by periodically collecting the social network content.

14. The content providing system of claim 9, wherein
the at least one processor is configured to provide the word set to the client and to transfer the target content to the client in response to a content request from the client, and
the client requests the target content based on a result of comparing the user information to the word set.

15. The content providing system of claim 9, wherein the at least one processor is configured to receive the user information from the client and to transfer the target content to the client based on a result of comparing the user information to the word set.

* * * * *